United States Patent [19]
Fink

[11] 3,963,249
[45] June 15, 1976

[54] CHUCK SEAL

[76] Inventor: Anton Fink, 149 Crescent Drive, Albertson, N.Y. 11507

[22] Filed: May 21, 1975

[21] Appl. No.: 579,414

[52] U.S. Cl. ............................... 279/1 ME; 279/4; 279/110
[51] Int. Cl.² ......................................... B23B 31/20
[58] Field of Search .................... 279/1 ME, 4, 110; 82/34; 269/321 ME, 285

[56] References Cited
UNITED STATES PATENTS

| | | |
|---|---|---|
| 2,356,198 | 8/1944 | Barry .............................. 279/1 ME |
| 2,376,594 | 5/1945 | Hite ................................ 279/1 ME |
| 2,711,904 | 6/1955 | Gartner ........................... 279/1 ME |
| 2,817,532 | 12/1957 | Hohwart ......................... 279/1 ME |
| 3,089,708 | 5/1963 | Long ............................... 279/1 ME |

*Primary Examiner*—Leon Gilden
*Attorney, Agent, or Firm*—Bauer, Amer & King

[57] ABSTRACT

An elastomeric cover for a chuck having movable jaws. The cover effects isolation of the chuck from the ambient environment while permitting jaw movement.

10 Claims, 8 Drawing Figures

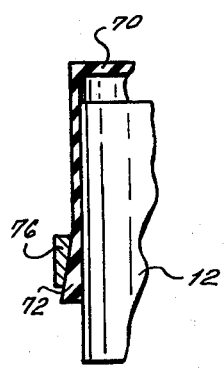
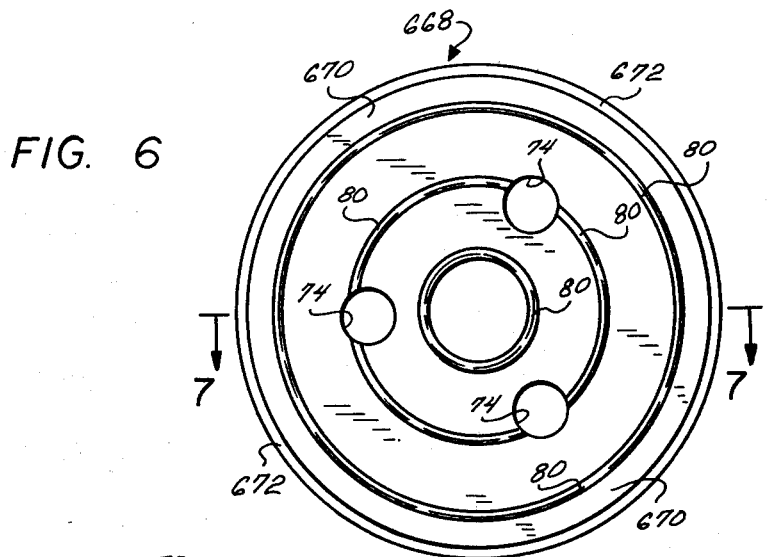
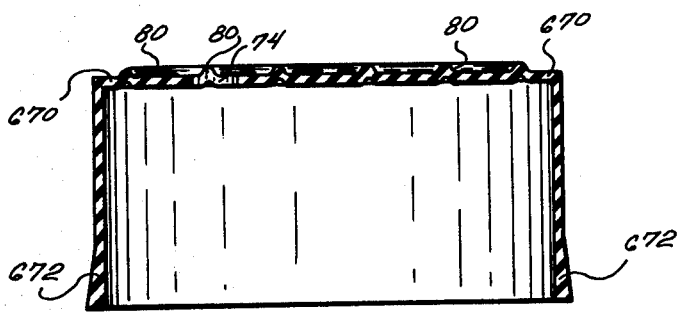
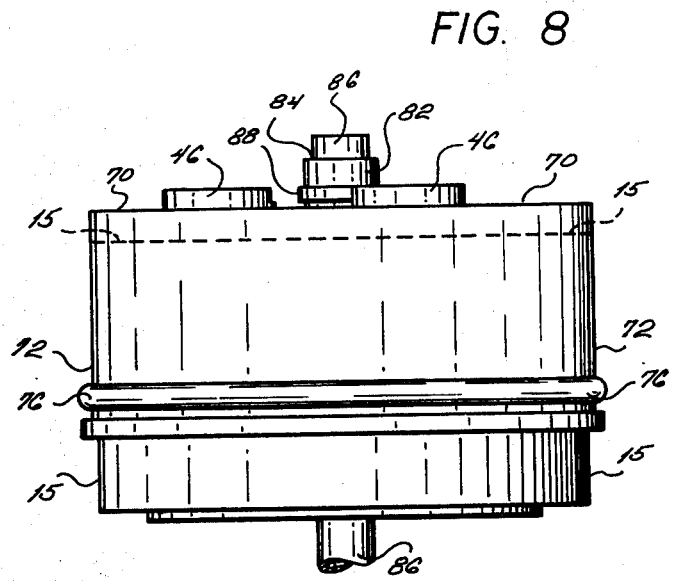

3,963,249

CHUCK SEAL

FIELD OF THE INVENTION

This invention relates to a seal or cover and more particularly it relates to a cover for a machine chuck designed to isolate the chuck from the ambient environment.

BACKGROUND OF THE INVENTION

In grinding or polishing various stock and particularly glass lenses it is often times desirable to immerse the same in an abrasive fluid. To do so the lens is placed in a precision fixture or chuck and then both of them are immersed in the abrasive liquid. A grinding element is then likewise immersed in the abrasive bath and brought into contact with the glass to effect the shaping or polishing thereof. Yet as is apparent the chucks designed to hold and support the glass indeed, precision chucks generally, require the utmost tolerance to insure proper lens shaping or part forming if that be the case. The internal components of these chucks or the actuator parts thereof are machined and coact to produce jaw accuracies to 0.0001 inch with some models having a repeatability to 50 millionths of an inch.

It is not startling to find that when a chuck is immersed in the abrasive grinding fluid or other hostile enviroment, the abrasive particulates or corrosive gases readily find their way onto critical control elements. The particulates effect a rapid abrasion and wear of the precision elements the effect of which rapidly degrades chuck tolerances rendering the same useless. Then too, the particulates lodge on control gears or find their way between moving members to cause erratic operation if not total immobilization.

To eliminate or substantially reduce accelerated abrasive wear it has been proposed to maintain snug if not lightly force fitting engagement on all interfaces exposed to the immersing fluid. This has met with some degree of success particularly when the abrasive particulates are relatively large. But unfortunately the fines from the grinding operation eventually find their way into the interfere elements of the chuck so that this scheme is of reduced utility. Moreover, during some polishing operations, the polishing fluids have abrasive "particulates" measured in microns. Irrespective of the degree of fit between chuck interfaces, these nearly molecular particulates find their way onto critical control surfaces. Accelerating the migration of particulates into the chuck interior is the pressure gradient that may exist across the chuck face. As the chuck spins localized cavitation may cause air inside the chuck to rarify producing this unwanted pressure gradient between he chuck interior on the one side, and the dense grinding fluid on the other.

Then again, it has been suggested to pressurize the chuck interior. Yet such a procedure is costly and any escaping fluid degrades the consistency of the grinding medium as it foams and "bubbles" about the chuck and workpiece. These voids in the grinding medium add to the tendency of the same to cavitate about the workpiece leading to the uneven grinding thereof or deleterious localized heating.

OBJECTS OF THE INVENTION

It is therefore an object of the present invention to provide a detachable cover or seal for a precision chuck.

It is another object of the present invention to provide a seal for a precision chuck that allows unobstructed access to the workpiece during the operations performed thereon.

It is a further object of the present invention to provide a chuck seal that effects complete isolation of the chuck when the same is immersed in a fluid.

It is a still further object of the present invention to provide a sealing member for a precision chuck that allows movement of the chuck jaws while maintaining integrity of the seal.

It is yet another object of the present invention to provide a seal element for a lathe chuck that readily adapts to a variety of chuck sizes and that is demountable thereon, simple in design and therefore inexpensive to manufacture.

Other objects and features of the present invention will become apparent from the following detailed description considered in connection with the accompanying drawings. It is to be understood however that the drawings are designed for purposes of illustration only and not as a definition of the limits of the invention for which reference should be made to the appending claims.

BRIEF DESCRIPTION OF THE DRAWINGS

In the drawings wherein the same reference numeral denotes the same element throughout the several views:

FIG. 5 is a partial view showing the cover engaging the chuck along another portion thereof;

FIG. 6 is a top view of a modified form of the inventive cover;

FIG. 7 is a view along the line 7—7 of FIG. 6; and

FIG. 8 is another modified form of the present invention showing a tube for cooling fluid passing through the inventive cover of FIG. 2.

DETAILED DESCRIPTION OF THE PREFERRED EMBODIMENT

Figure 1:
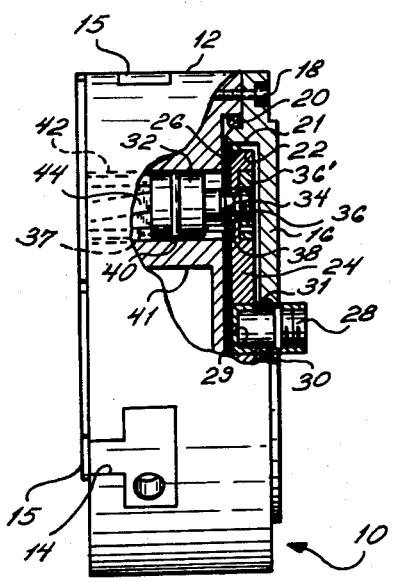
FIG. 1 is a sectional view of a precision chuck assembly available in the art and showing same devoid of the inventive seal.

In general the present invention includes an elastomeric cover or seal fluid tightly, albeit demountably, attached to the chuck. The method of attaching the seal includes compressing portions of same in several jaw extensions that mount on each of the chuck jaws. The jaw extensions perform several functions. They hold the workpiece between parts thereof that extend out of the cover, and, they effect a compressive, fluid tight seat to receive appropriate portions of the seal. The extensions are constructed to maintain dimensional rigidity or alignment of the workpiece on the chuck since this rigidity would normally be degraded by imposition of an elastic layer in the reactive or transmissibility path between the workpiece and chuck. Preferably, the extensions are defined by two mating members that are coaxial about a central axis. The extensions meet along an annular interface that acts to pinch the appropriate cover portions effecting the fluid tight seal. Because the cover is an elastomer, it readily accommodates changes in the relative spacing of the jaw extensions so that the same can selectively move to accept different sized workpieces.

In detail now and referring to the FIGS. 1 through 5, a chuck indicated generally by reference numeral 10 is shown to be fluid pressure operated and for precision control. A chuck of this type is described in U.S. Pat. No. 3,727,929 yet for purposes of description and understanding, the salient features of its construction and operation are as follows: A steel body portion 12 is formed with channels 14 each of which receives a respective manually sliding jaw member 15. A back plate 16 is secured to body portion 12 by means of bolts 18. An 0 ring 20 effects an air tight seal between back member 16 and body portion 12. A wall 21 defines a cylinder 22 for receiving a piston 24. This piston is sealed against wall 21 by means of an 0 ring 26. Piston 24 carries a standard threaded coupling 28 to which a dual air hose (the hose not shown) may be attached. Coupling 28 is provided with a first orifice 29 through which air communicates to one side of the piston and a second orifice 31 through which air communicates to the other side of the piston. By means of a conventional four-way air valve (not shown) air may be admitted to one side of the piston and released from the other side selectively clamping and unclamping the jaws. As coupling 28 passes through back portion 16, it is sealed thereto by means of an 0 ring 30.

The piston 24 carries three actuators 32 spaced one hundred twenty degrees apart. Each actuator is provided with a shaft portion 34 terminating in a threaded portion 36 to which there is secured a spanner nut 36'. The spanner nut is used to tighten the actuator against the piston and then a hole is drilled through spanner nut 36' and a pin 38 is inserted therein to lock the actuator to the piston in permanent alignment. Each actuator 32 is provided with an 0 ring seal 40 which lies against a bore 42 in body 12. Actuator 32 is provided with key 44 which is skewed relative to the central line of the actuator. For ease of manufacture the actuator is made in two pieces one bearing on the skewed key and the threaded portion, and the other on a sleeve carrying 0 ring 40. The two portions of the actuator are then locked together by a pin 37.

In operation and as air is introduced into the cylinder through orifice 29, the piston moves to the rear in the direction of back member 16. This causes the jaws to be actuated in a radial direction toward the center of the chuck providing the clamping action. When air pressure is released through orifice 29 and air introduced through orifice 31, the jaws are retracted, permitting removal of the workpiece as will be described more fully hereinafter.

Attached to the outboard face of each jaw is a jaw extension which is generally indicated by reference numeral 45. Jaw extension 45 comprises two parts 46 and 48. Outer part 46 is essentially of circular configuration and includes an inner cavity 50 defined by an annular skirt 52. A bore 54 is axially disposed through part 46 and includes a recessed portion 56. Part 46 is further defined by a shelf 47 that receives the workpiece as will be explained shortly.

Figure 4:
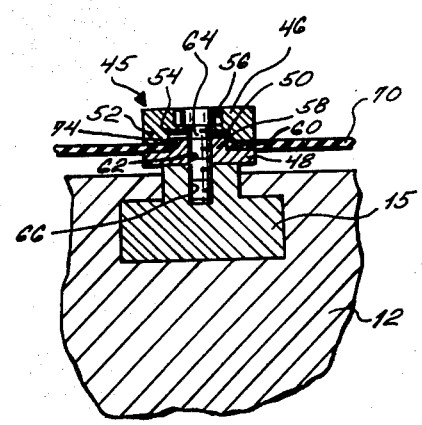
FIG. 4 is a partial sectional view along the line 4—4 of FIG. 3 showing how the cover fluid tightly engages the chuck at one portion thereof.

Jaw extension inner part 48 includes an annular platform 58 complimentary with and designed to snuggly fit into chamber 50 of outer part 46. An annular shelf 60 is perimetrically disposed about part 48 and is in confronting relation to the leading lip or rim of skirt 52. An aperture 62 is disposed through part 48 with the aperture in registration or axially aligned with bore 54 when platform 58 engages cavity 50. A threaded stud 64 is passed through apertures 54 and 62 to be received in a tapped aperture 66 in jaw 15 while the stud head is captured in recess 56. In order to prevent binding or sticking of part 48 on the outboard face of body portion 12 as the part in conjunction with jaw 15 moves relative to the body, a clearance scheme is provided to lift the face of lower part 48 from contacting that portion of body 12 immediately thereunder. This scheme might comprise shims or washers interposed between the opposed faces, or, and as shown in FIG. 4, having a portion of jaw 15 spaced or extending from the outboard face of body 12.

An elastomeric cover or seal, generally indicated by reference numeral 68 — and by elastomeric is meant both natural and synthetic material — is formed so as to be cup-shaped. As such, seal 68 is defined by an essentially flat face 70 and a depending skirt portion 72. The forward or leading rim 74 of skirt 72 flares outwardly as shown in FIG. 5. Face 70 is formed with a number of apertures 74 with the number chosen to accord with the number of jaw extensions used. The aperture pattern is essentially in one to one registration with the radial array defined by jaws 15. Thus, if the jaws are spaced one hundred twenty degrees, so too is one aperture in relation to the other.

Each aperture 74 is sized approximately to fit over its respective lower extension part 48 and thereby have the adjacent regions of the seal defining the aperture rest on shoulder 60. Skirt 72 fits about the cylindrical periphery of chuck body 12 and is fluid tightly and demountably sealed thereto by driving an annular sealing ring 76 onto flared rim portion 74 during operation of the invention as will now be described.

Figure 2:
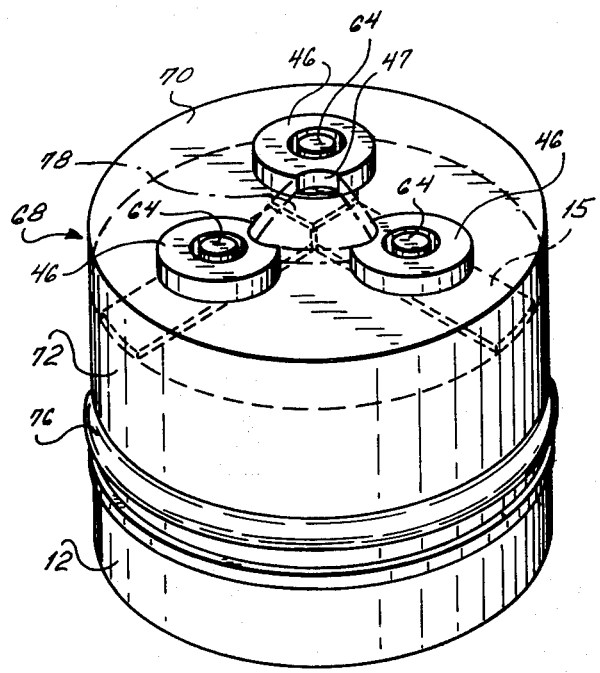
FIG. 2 is a perspective view of the inventive cover showing how same is attached to the chuck of FIG. 1 by means of jaw extensions that project out of the cover to allow grasping of the workpiece.
Figure 3:
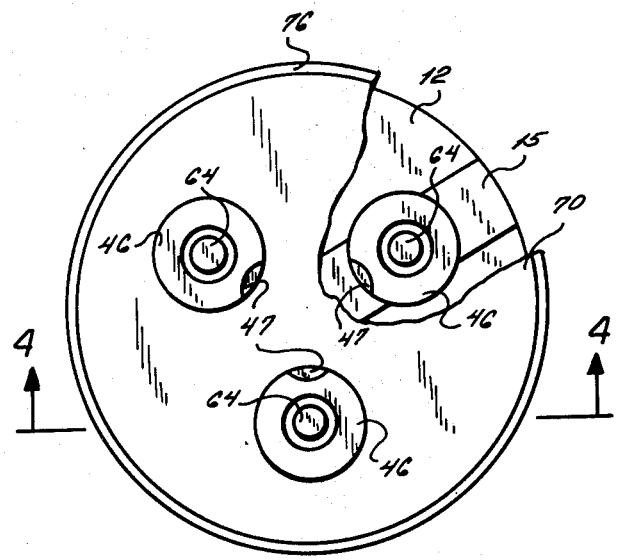
FIG. 3 is a plan view of that seen in FIG. 2 with part of the cover broken away for purposes of clarity.

In operation and before elastomeric cover 68 is placed on chuck 10, lower jaw extension parts 48 are placed in a respective aperture in face 70. Parts 48 are positioned in an associated aperture 74 so that platform 58 thereof projects outwardly from its respective aperture. Seal 68 is then placed over and onto chuck 10 so that body portion 12 is included in skirt 72. Apertures 62 are then lined up over their respective tapped bores 66 in associated jaws 15. Upper jaw extension 46 is then placed over a respective protruding platform 58 so that the latter engages in associated cavity 50 of the former. A respective stud 64 is then passed through apertures 54 and 62 and threaded into tapped bore 66. Each stud is tightened into its associated bore locking part 48 onto jaw 15. And, as the stud is tightened down, it brings with it upper part 46. As part 46 is driven onto part 48, the leading edge or rim of skirt 52 pinches and compresses that portion of seal 70 riding on or in confronting relation to shoulder 60. This compressing or pinching action effects a fluid tight seal about each aperture 74 and hence about elastomer face 70. Sealing ring 76 is then driven down on flared skirt portion 74 driving same about body 12 to complete the sealing and isolation of chuck 10. Once elastomer 68 is attached to the chuck, a workpiece 78 that is indicated in phantom in FIG. 2 is placed approximately centrally between the exposed parts 46. Air is admitted through aperture 29, and as described above, jaws 15 are driven inwardly which action likewise displaces parts 46. The parts are so displaced until their lands or shelves 47 strike respective portions of the workpiece tightly and frictionally grasping the same. It is apparent that during this sequence, as parts 46 move, seal 68 readily deforms or stretches to accommodate movement of the parts. Workpiece 78 and the sealed chuck is now ready for immersion in an abrasive bath or hostile environment.

Owing to the fact that platform 58 snuggly engages the inboard peripheral wall defining chamber 50, part 46 is prevented from even minute lateral movement with respect to chuck body 12.

In those instances where workpiece 78 is expected to vary significantly in size, the "stretch" attainable by face 70 may not be sufficient. To accommodate the greater flexibility needed for the seal where significant jaw travel is required, the modification of FIGS. 6 and 7 can be employed. Referring now to these last mentioned figures a seal 688, essentially similar to seal 68 of FIGS. 1-5 has the forward face 670 thereof formed with pleats or corrugations 80. Operation of this modification remains essentially as that described for FIGS. 1–5, it being readily apparent that pleats or folds 80 provide a greater degree of "stretch" for the jaws and part extensions than plane face 70 of FIG. 2.

Other modifications and variants utilizing the inventive concept readily suggest themselves. One such variant is shown in FIG. 8 where a central neck 82 having a dispensing aperture 84 is integral with face 70. The neck is to be clamped onto a lubricating tube 86 that extends centrally through chuck 10 and outboard of cover face 70. Means 88 fluid tightly clamps neck 82 onto tube 86 maintaining the integrity of the seal provided by elastomer 68. In the construction depicted in FIG. 8, as the workpiece is turned, milled, grinded etc. it can be lubricated internally and without the particulates resulting therefrom finding their way into chuck 10.

While only a few embodiments of the present invention have been shown and described it is to be understood that many changes and modifications can be made hereto without departing from the spirit and scope hereof.

What is claimed is:

1. For a chuck having movable jaws:

an elastomeric cover adapted to fit about the chuck with said cover having an integral skirt;

aperture means in said cover with each one thereof substantially in registration with a respective jaw of the chuck;

means received in each of said apertures to effect a localized sealing of same on a respective chuck jaw and adapted to hold the workpiece; and, means to seal the skirt perimetrically on the chuck, thereby to isolate the chuck from the ambient environment while permitting movement of the jaws.

2. The chuck of claim 1, said cover further defined by a flat face from which the skirt depends with each of said apertures formed in said face.

3. The chuck of claim 1, said means effecting the localized sealing comprising a number of jaw extensions each of which includes an upper part and lower part mating along a face that acts to compress that portion of said cover adjacent to and defining a respective one of said apertures.

4. The chuck of claim 3, said upper part formed with a cavity and said lower part formed with a platform complimentary to the periphery of said cavity and adapted to snuggly fit therein.

5. The chuck of claim 4, said upper and lower part further including stud means adapted to effect concomitant, albeit demountable, attachment of both of said parts to a respective jaw.

6. The chuck of claim 2, said face including a plurality of folds to accommodate substantial movement of the jaws.

7. The chuck of claim 1, the leading edge of the skirt defined by a flared portion to interferingly engage said skirt sealing means.

8. The chuck of claim 7, said skirt sealing means comprising a ring.

9. The chuck of claim 1, said skirt sealing means comprising an elastic band biasing the skirt against a perimetric portion of the chuck.

10. The chuck of claim 9, said elastic band being integral with the skirt.

* * * * *